Sept. 28, 1943. R. S. PHAIR 2,330,377
ELECTRICAL CONTROL SYSTEM
Filed Dec. 31, 1940
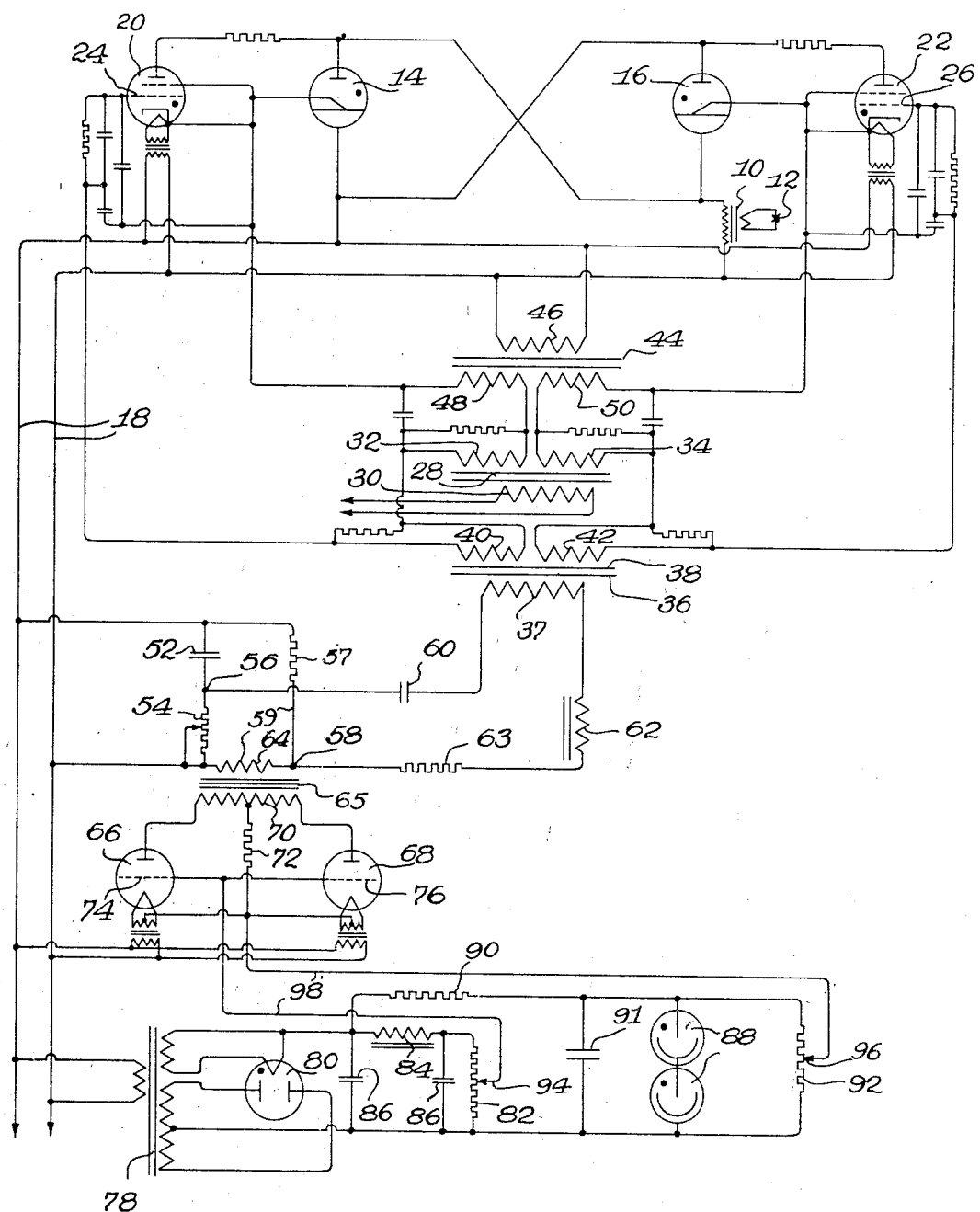
INVENTOR
Robert S. Phair
BY John P. Tarbox
ATTORNEY Patented Sept. 28, 1943

2,330,377

UNITED STATES PATENT OFFICE 2,330,377

ELECTRICAL CONTROL SYSTEM

Robert S. Phair, Philadelphia, Pa., assignor to Edward G. Budd Manufacturing Company, Philadelphia, Pa., a corporation of Pennsylvania Application December 31, 1940, Serial No. 372,689

27 Claims. (Cl. 171—119)

This invention relates to electrical control systems and more particularly to a system for accurately controlling the flow of power in a load circuit connected to a line subject to voltage variations.

In heavy power applications such as electric resistance welding, it is important that the energy or heat applied during a welding operation be maintained under close control so that, within limited ranges, a certain amount of welding heat is generated, the amount of welding heat necessary being sufficient to assuredly produce a safe weld. In installations where a plurality of resistance welding machines are connected to a single line, the heavy draft of power for short intervals often results in a considerable line voltage fluctuation, which flunctuation may be of an extremely momentary sort. The actual weld period employed is frequently two or three cycles or even as short as a half cycle, and if, for any reason, the line voltage should be momentarily decreased during the effecting of a weld where the current flow is of such short duration, a cold weld is likely to result, which weld would be of reduced strength and not meet the ordinary requirements for safe welding. The present invention is therefore directed to a system wherein substantially instant compensation is obtained for line voltage variations, so that despite any change in line voltage, the energy supplied to the weld and the heat generated at the weld will remain substantially constant.

It has been the practice in resistance welding to provide manual means for varying the welding heat so that an operator may quickly adjust the welding apparatus for operation upon various materials and thicknesses. Once such an adjustment has been made, however, it is important that for safe welding the heat or energy so chosen shall remain constant for such series of welds as are to be made under the conditions for which the welding apparatus is adjusted. With changes in line voltage, however, the welding current is subject to change, and in some instances, a change in line voltage, for instance a decrease therein, decreases the welding heat, not proportionally but by an amount much greater. Compensation for variations which would result from line voltage changes is provided for by the present invention.

The invention particularly relates to an arrangement for compensating for line voltage variation which does not interfere with the normal operation of the manual heat control, and further is directed to a system readily capable of insertion into a common type of "thyratron" or "ignitron" welding control. The system is additionally completely operated from the source of power, is readily adjustable to the end that it is adapted to fully compensate for line voltage variation.

It is accordingly an object of the present invention to provide a line voltage drop compensating apparatus for use in power circuits adapted to substantially instantaneously fully compensate for the drop in energy ordinarily due to such line voltage variation.

Another object of the invention is to provide in a welding apparatus and the like wherein phase shift control is employed for heat regulation, a line voltage variation compensator adapted to act upon the heat regulator phase shifting circuit substantially independently of and free of any consequential interference with the normal heat control operation thereof.

A still further object of the invention is to provide a voltage drop compensator readily adapted for use in conjunction with standard welding control apparatus and for any connection thereto.

Still another object of the invention is to provide a voltage compensating device of the type described, wherein the operating power requirements are derived from the line itself.

Yet a further object of the invention is to provide a voltage variation compensating device for use in conjunction with welding control apparatus wherein the extent of compensation may be readily adjusted to suit conditions.

Yet another object of the invention is to provide, in a resistance welding apparatus employing phase shift control, a line voltage compensating device adapted to completely compensate for line voltage variations and, in addition, the exaggerated loss of welding heat resulting therefrom.

The above objects are accomplished by the structure and arrangement set forth in the following detailed description when taken in connection with the accompanying drawing. It is to be expressly understood, however, that the drawing is employed for purposes of illustration only and is not designed as a definition of the limits of the invention, reference being had to the appended claims for this purpose.

In the drawing, the single figure illustrates a circuit to which the compensator is especially adapted.

Referring to the drawing, there is shown a welding transformer 10 connected to a welding load 12 through a pair of inversely connected "ignitron" tubes or gaseous arc discharge devices 14 and 16 across the power supply line 18.

The firing of the "ignitrons" 14 and 16 is controlled by a pair of screen grid "thyratron" tubes 20 and 22 known as the firing tubes. The grid controlled "thyratron" tubes supply the ignition spark to the "ignitrons" 14 and 16 at the proper point in the cycle to properly control the flow of current therethrough to the welding transformer 10. Control of the particular time of firing of the "ignitrons" in each cycle of alternating current is obtained through control over the grids 24 and 26 of the firing tubes 20 and 22, the potential for which is supplied from a series of transformers, the functions of which will presently be explained.

In welding apparatus of the resistance welding type, there is usually employed a timer adapted to deliver to the control circuit of the welding apparatus impulses in the form of sinusoidal alternating current limited to the timer controlled period, for example, one, two or any desired number of cycles or full waves. The alternating current impulses emitted by such a timer are delivered to the control circuit through a transformer 28, the primary 30 of which is connected to the timer and the secondaries 32 and 34 of which are connected to each of the grids 24 and 26, respectively, of the firing tubes 20 and 22.

In order to supply the grids of the firing tubes with a sharp voltage peak adapted to fire the "ignitrons" during the time the plates thereof are positively charged, a peaking transformer 36 is provided, the transformer being adapted through the use of a saturable core 38 to provide voltage peaks in the secondaries 40 and 42, which secondaries are connected in series with the secondaries 32 and 34 of the timer transformer. In order that the peaking transformer may operate continuously and yet the voltage peaks provided thereby be effective upon the grids 24 and 26 of the firing tubes at such time only as the timer-controlled transformer is excited, a hold-off or bias transformer is provided indicated by the reference character 44. The transformer is provided with a primary 46 connected to the line 18 and secondaries 48 and 50 connected in series with the timer controlled transformer secondaries 32 and 34 and the peaking transformer secondaries 40 and 42. The secondary 48 of the hold-off or bias transformer is so connected with reference to the secondary 40 of the peaking transformer as to offset the voltage peak provided thereby. Thus the positive voltage peak is biased by the negative or opposite voltage supplied by the transformer secondary 48, so that normally the grid 24 is negatively biased to such an extent that the voltage peak produced by the peaking transformer 38 is ineffective to permit the grid voltage to reach the critical value. The timer transformer 30, however, has its secondaries 32 and 34 connected with reference to the hold-off or bias transformer secondaries 48 and 50, such that upon the flow of a timer current in the primary of the timer transformer, a voltage is induced in the secondary neutralizing the voltage of the secondary in the bias transformer, thus offsetting the bias of the hold-off transformer and permitting the voltage peaks produced by the peaking transformer to carry the grid potential of the firing tubes above the critical value so that the "ignitrons" are thus fired.

Shifting of the phase relation of the peaks produced by the peaking transformer with reference to the line voltage 18 is employed to produce control over the time each of the "ignitrons" is fired. For example, if the "ignitron" is fired at the beginning of its half cycle, a full wave of current will flow therethrough. But, on the other hand, if the "ignitron" is not fired until a substantial portion of its half cycle is completed, a smaller portion of current only will have time to flow therethrough, while the plate is positive. By shifting the phase relation, control over the current permitted to flow through the "ignitrons" is accomplished, thereby controlling the welding heat applied at the welding load 12. In order to readily shift or change the phase relationship of the voltage peaks supplied by the peaking transformer 36 with reference to the voltage of the line 18, a phase shift circuit comprising a capacity 52 connected in series with a variable resistance 54 is provided. The potential of an intermediate tap such as 56 between the capacity 52 and the variable resistance 54, with reference to the potential of a point such as 58 located between two portions 57 and 64 of a dividing impedance 59 connected across the line 18, produces a voltage whose phase relationship to the phase of the voltage of the line 18 may be readily shifted by varying the resistance 54 with respect to the capacity 52.

The primary 37 of the peaking transformer is connected between the tap 56 of the circuit formed by the resistance 54 and the capacity 52 and the tap 58 of the dividing impedance 59 through a suitable capacity 60, inductance 62 and current limiting resistor 63, which form in effect a tuned circuit, the latter being preferred because of the operation of the peaking transformer with the core 36 thereof above saturation. It can readily be seen that from the circuit thus far described, that a reduction in the voltage across the line 18 will reduce the voltage across the capacity 52, resistor 54 and the dividing impedance having tap 58 so that the current supplied to the peaking transformer primary 37 will correspondingly be reduced. However, because of the saturation of the core of the peaking transformer, this reduced voltage will produce an effective increase in the inductance of the primary 37 which in turn tends to change the characteristics of the tuned circuit such that the voltage between the points 56 and 58 is shifted in phase relation by an amount substantially proportional to the change in the inductance 37 due to such voltage change. The resultant shift in the phase angle changes the firing time of the "ignitrons" so that not only is the current reduced in the welding transformer 10 by the decrease of line voltage but in addition the length of time over which the current flows is reduced by the shift in the phase angle resulting from the line voltage drop.

In the usual welding circuit the rheostat 54 may be manually adjustable and graduated so that an operator can quickly set the apparatus to effect a certain welding heat which through experience has been found to be practical for particular conditions at hand. The adjustment for the proper heat under normal conditions, however, is affected by subsequent changes in line voltage so that the proper selection of a welding heat by suitable adjustment of the resistance 54 can by no means assure the apparatus of producing welds of satisfactory strength.

In order to counteract the effect of line voltage fluctuations upon the welding apparatus, there is provided in conjunction with the dividing impedance 59, an impedance transformer 65 having a primary 64, whose resistance or impedance is electronically varied through the operation of a pair of vacuum tubes 66 and 68 connected across the secondary 70 of the transformer. Vacuum tubes 66 and 68 together with the transformer secondary 70 and the center tap resistance 72 form in effect a resistance load upon the line 18 and in accordance with the grid excitation of the tubes the effective resistance or impedance of the coupled primary 64 of the transformer is varied. The line voltage is usually sinusoidal and is impressed on the transformer winding 64 through the resistor 57. It is well known that a tube having a unidirectional negative grid bias possesses unidirectional linear resistance characteristics within the range of its rating. The tubes 66 and 68 have such a negative unidirectional grid bias. Therefore, the transformer winding 70 does not distort the sinusoidal voltage in the transformer winding 64. To supply the grids 74 and 76 of the vacuum tubes 66 and 68 with a grid potential which may vary inversely in accordance with variations in the line 18, there is provided a source of direct current suitably rectified from the line 18, through a transformer 78, rectifier 80, filter 84 and 86 and the potentiometer 82. The voltage across the potentiometer will be seen to vary with the line voltage.

To increase the range of compensation adjustment, there is also provided a circuit supplied by direct current from the rectifier 80 and transformer 78 including a pair of gaseous discharge voltage regulator tubes 88 operating in conjunction with filter condenser 91, resistance 90 and potentiometer 92 to maintain a constant direct current potential across the potentiometer 92, such as could be derived from a battery if desired, regardless of the variations in line voltage. Thus through the proper adjustment of the sliding contactors 94 and 96 on the potentiometers 82 and 92 respectively and the connections 98 to the grids 74 and 76 of the two vacuum tubes 66 and 68 and the cathodes thereof, the grid potential may be caused to increase negatively with a decrease in line voltage by an amount sufficient to change the effective value of the impedance of the primary 64 of the transformer. With the connections illustrated, it is possible to have the grid potential of the tubes 66 and 68 increase negatively as the line voltage drops by having the unidirectional constant potential across the potentiometer 92 larger than the unidirectional potential across the potentiometer 82, which varies with the line voltage, so that the difference between these two increases as the line voltage decreases. With such increase in impedance the potential at the point 58 is caused to shift with reference to the potential at the point 56 producing a change of phase thereof such that the voltage peaks of the peaking transformer will occur earlier in the cycle and consequently fire the "ignitrons" a suitable amount earlier in each half-cycle so that through the increased time of current flow the "ignitron," the drop in line voltage thereacross is compensated for, and the same heat generated at the weld, the current amplitude drop due to loss of or drop in line voltage being offset by the increased time of current flow in each half-cycle.

The operation of the voltage control circuit should appear from the foregoing. It will be appreciated that the control of the phase angle of the firing voltage peaks manually for heat control and automatically for voltage variations produces a control in welding circuits of the weld heat to the end that highly uniform and consistent satisfactory welding is accomplished. The additional control operating automatically upon changes of line voltage is readily added to a system wherein the manual heat control exists, it merely being essential to add to the circuit the dividing impedance 59 with a connection as indicated at the tap 58. Since the manual control of welding heat varies over a considerable range of adjustment, and the automatic correction for voltage variation requires a much lesser range, the independent nature of the line voltage combination through the use of the dividing impedance 59, one branch of which is variable, has the advantage of preventing the control resulting from line voltage variation from being considerably distorted during voltage control when the welding apparatus is adjusted to operate the extremely high or relatively low welding heat as is provided for by the adjustment of the resistor 54. For example, the capacity resistance circuit comprising the capacity 52, resistance 54, through the variation of the resistance 54, controls the phase angle of the ignitrons and the resistance can be suitably calibrated to make allowance for a non-linear variation in heat with uniform increments in the change of resistance 54. However, with changes of resistance or impedance in the branch 64 of the dividing impedance 59, a more uniform and proportionate change is effected and consequently more accurate compensation in response to line voltage variation can be obtained.

Though but a single circuit illustrating the invention in conjunction with welding apparatus has been illustrated and described, it is to be understood that the invention may be applied in various forms. Various changes may be made in the arrangement of the circuit without departing from the spirit of the invention as will be apparent to those skilled in the art and reference, therefore, should be had to the appended claims for a definition of the limits of the invention.

What is claimed is:

1. An electric power system comprising in combination, a load circuit, circuit means connecting the load circuit to a source of alternating current, a pair of inversely connected electronic gaseous discharge devices disposed to conduct the entire flow of current in said load circuit, control means for rendering said electronic devices conducting to permit the flow of load current, phase shift means comprising a resistance reactance network having two circuits connected to be energized from the source of alternating current in parallel, one of said circuits comprising a resistance and reactance in series, and the other comprising an adjustable impedance, for effecting the energization of said control means at a predetermined time in a cycle of the alternating current, and electronic means automatically responsive to variations in the voltage of said alternating current source for controlling the voltage phase of the adjustable impedance of said phase shift means to correspondingly adjust the time in each cycle when said electronic discharge devices are rendered conducting, for maintaining the energy supplied to the load circuit substantially constant.

2. An electric power system comprising, in combination, a load circuit, circuit means connecting the load circuit to a source of alternating current, a pair of inversely connected electronic gaseous discharge devices disposed to conduct the entire flow of current in said load circuit, control means for rendering said electronic devices conducting to permit the flow of load current, phase shift means comprising a resistance reactance network having two circuits connected to be energized from the source of alternating current in parallel, one of said circuits comprising a resistance and reactance in series and relatively adjustable, and the other comprising an adjustable impedance, for effecting the energization of said control means at a predetermined time in a cycle of the alternating current and electronic means automatically responsive to variations in the voltage of said alternating current source for controlling the voltage phase of one of said parallel circuits relative to the other to correspondingly adjust the time in each cycle when said electronic discharge devices are rendered conducting for maintaining the energy supplied to the load circuit substantially constant regardless of voltage variations in said source and means for regulating the adjustment of the other parallel circuit to correspondingly adjust the time in each cycle when said electronic discharge devices are rendered conducting and for at will selecting a predetermined energy flow in said load circuit.

3. An electric power system comprising, in combination, a load circuit, circuit means connecting the load circuit to a source of alternating current, electronic gaseous discharge devices connected to control the flow of current in said load circuit, control means for rendering said electronic devices conducting to permit the flow of load current, phase shift means comprising a resistance reactance network having two circuits connected to be energized from the source of alternating current in parallel, one of said circuits comprising a resistance and reactance in series, and the other comprising an adjustable center tap dividing impedance, for effecting the energization of said control means at a predetermined time in a cycle of the alternating current, and electronic means automatically responsive to variations in the voltage of said alternating current source for controlling the voltage phase of the adjustable center tap dividing impedance of said phase shift means to correspondingly adjust the time in each cycle when said electronic discharge devices are rendered conducting, for maintaining the energy supplied to the load circuit substantially constant.

4. An electric power system comprising, in combination, a load circuit, circuit means connecting the load circuit to a source of alternating current, a pair of inversely connected electronic gaseous discharge devices disposed to conduct the entire flow of current in said load circuit, control means for rendering said electronic devices conducting to permit the flow of load current, phase shift means comprising a resistance reactance network having two circuits connected to be energized from the source of alternating current in parallel, one of said circuits comprising an adjustable impedance, for effecting the energization of said control means at a predetermined time in a cycle of the alternating current, and means automatically responsive to variations in the voltage of said alternating current source for controlling the functioning of the adjustable impedance of said phase shift means to correspondingly adjust the time in each cycle when said electronic device is rendered conducting for maintaining the energy supplied to the load circuit substantially constant, said adjustable impedance including as a portion thereof a transformer impedance, and said voltage responsive means including grid controlled electronic conducting means associated with said transformer impedance for varying the potential drop thereacross, and means for controlling the grid of said grid controlled means inversely in accordance with line voltage changes, said grid controlling means including means for deriving a grid control potential variable in proportion to variations in source voltage, said last-named means including a source derived gaseous discharge regulated constant potential means, and a source derived uni-directional potential means variable with variations in source voltage together with connection to said constant potential means and variable potential means for supplying said variable grid control potential.

5. In a welding control unit of the type having a pair of electronic gaseous discharge tubes for supplying alternate half cycles of current to a load, a pair of grid-controlled electronic tubes adapted to fire the first mentioned pair of tubes, a grid-control circuit for the firing tubes, means for impressing opposed impulses upon the circuit, one of said impulses being a timing impulse to control the number of half cycles during which the firing tube is effective, a peaking impulse for the control circuit, a phase shift means comprising a reactance with a resistance in series and relatively adjustable for controlling the duration of current flow in each half cycle, a source of constant unidirectional voltage, a source of unidirectional voltage variable in value with line voltage and smaller in value than said constant voltage, and a device for actuating said phase shift means in response to a changing differential between said uni-directional constant voltage and said smaller uni-directional voltage whereby such differential varies inversely with changes in voltage on the line.

6. An electric power system comprising, in combination, a load circuit, circuit means connecting the load circuit to a source of alternating current, electronic gaseous discharge conducting means connected to control the flow of current in said load circuit, control means for rendering said electronic means conducting to permit the flow of load current, phase shift means connected to be energized from the source of alternating current for effecting the energization of said control means at a predetermined time in a cycle of the alternating current, means automatically responsive to variations in the voltage of said alternating-current source for controlling the functioning of said phase shift means to correspondingly adjust the time in each cycle when said electronic means is rendered conducting, said automatically responsive means including an electronically controlled impedance and an electronic device having a grid circuit provided with means for varying the grid bias inversely with a change in voltage on the load circuit, said last mentioned means including uni-directional potentials at least one of which varies with the voltage on the load.

7. In an apparatus of the type including an electronic gaseous discharge tube supplied from a source of alternating current power, a firing tube for the discharge tube, grid-control mechanism for the firing tube having a peaking device and a phase shifting means whereby the duration of current through the discharge tube is varied by the phase shifting means, the improvement for automatically controlling the duration of current through the discharge tube by advancing the time of firing the discharge tube in response to a drop in voltage on said phase shift means, which comprises electronic means for changing the phase angle of peaking voltages in response to changes in voltage on the discharge tube.

8. An electric power system comprising, in combination, a load circuit, circuit means connecting the load circuit to a source of alternating current, electronic gaseous discharge conducting means connected to control the flow of current in said load circuit, control means for rendering said electronic gaseous discharge means conducting to permit the flow of load current, phase shift means connected to be energized from the source of alternating current for effecting the energization of said control means at a predetermined time in a cycle of the alternating current, means automatically responsive to variations in the voltage of said alternating current source for controlling the functioning of said phase shift means to correspondingly adjust the time in each cycle when said electronic gaseous discharge means is rendered conducting, said automatically responsive means including an impedance and an electronic device for adjusting said impedance in response to said variations in voltage, said electronic device having a grid negatively biased by unidirectional voltages and increasing in amount as said voltage decreases.

9. An electric power system comprising, in combination, a load circuit, circuit means connecting the load circuit to a source of alternating current, electronic gaseous discharge conducting means connected to control the flow of current in said load circuit, control means for rendering said electronic gaseous discharge means conducting to permit the flow of load current, phase shift means connected to be energized from the source of alternating current for effecting the energization of said control means at a predetermined time in a cycle of the alternating current, means automatically responsive to variations in the voltage of said alternating current source for controlling the functioning of said phase shift means to correspondingly adjust the time in each cycle when said electronic gaseous discharge means is rendered conducting, said automatically responsive means including an impedance and an electronic device for adjusting said impedance in response to said variations in voltage, said electronic device having a grid biased solely by variable unidirectional voltages.

10. An electric power system comprising, in combination, a load circuit, circuit means connecting the load circuit to a source of alternating current, electronic gaseous discharge conducting means connected to control the flow of current in said load circuit, control means for rendering said electronic gaseous discharge means conducting to permit the flow of load current, phase shift means connected to be energized from the source of alternating current for effecting the energization of said control means at a predetermined time in a cycle of the alternating current, means automatically responsive to variations in the voltage of said alternating current source for controlling the functioning of said phase shift means to correspondingly adjust the time in each cycle when electronic gaseous discharge means is rendered conducting, said automatically responsive means including an impedance and an electronic device for adjusting said impedance in response to said variations in voltage, said electronic device having a grid biased in a manner such that the electronically variable impedance constitutes in effect a resistance load whereby the current in said variable impedance is not substantially distorted.

11. An electric power system comprising, in combination a load circuit, circuit means connecting the load circuit to a source of alternating current, electronic gaseous discharge conducting means connected to control the flow of current in said load circuit, control means for rendering said electronic gaseous discharge means conducting to permit the flow of load current, phase shift means connected to be energized from the source of alternating current for effecting the energization of said control means at a predetermined time in a cycle of the alternating current, means automatically responsive to variations in the voltage of said alternating current source for controlling the functioning of said phase shift means to correspondingly adjust the time in each cycle when said electronic gaseous discharge means is rendered conducting, said automatically responsive means including an impendance and an electronic device for adjusting said impedance in response to said variations in voltage, said electronic device having a grid biased solely by unidirectional voltages, said bias increasing as said voltage decreases.

12. An electric power system comprising, in combination a load circuit, circuit means connecting the load circuit to a source of alternating current, electronic gaseous discharge conducting means connected to control the flow of current in said load circuit, control means for rendering said electronic gaseous discharge means conducting to permit the flow of load current, phase shift means connected to be energized from the source of alternating current for effecting the energization of said control means at a predetermined time in a cycle of the alternating current, means automatically responsive to variations in the voltage of said alternating current source for controlling the functioning of said phase shift means to correspondingly adjust the time in each cycle when said electronic gaseous discharge means is rendered conducting, said automatically responsive means including an impedance and an electronic device for adjusting said impedance in response to said variations in voltage without substantially distorting the voltage wave of said source whereby said automatically responsive means is adapted for use with a peaking type control means.

13. An apparatus including means for transferring power for variable periods of time from a source of alternating current to an electrical load circuit, a means for controlling the timing of said first-mentioned means, and means responsive to the voltage of said source of power for controlling said timing control means, said source-voltage-responsive means comprising an electronic discharge device having a unidirectional grid bias that varies inversely with the source voltage whereby on decrease in said source voltage the power transfer to the load is for a longer time, and the energy consumption by the load is more nearly uniform irrespective of changes in said source voltage.

14. An electric system for transmitting power for variable amounts of time from an alternating current source to a load circuit and including an electron discharge conducting device connected to control the flow of current in the load circuit, means for producing a peaking voltage to render said electron discharge device conductive, phase shift means for controlling the time in a cycle of alternating current at which said electron discharge device is rendered conductive by said peaking voltage, said phase shift means including an electronically variable impedance having substantially the characteristic of a resistance and responsive to changes in voltage of said alternating current source whereby a voltage sine wave of said source is not distorted by said impedance and the effective shape of the peaking voltage wave is retained.

15. An electric system for transmitting power for variable amounts of time from an alternating current source to a load circuit and including a device connected to control the flow of current in the load circuit, means for producing a peaking voltage to render said device conductive, phase shift means for controlling the time in a cycle of alternating current at which said device is rendered conductive by said peaking voltage, said phase shift means including an electronically variable impedance responsive to changes in voltage of said alternating current source, said electronically variable impedance being controlled by a tube having a unidirectional grid bias which changes inversely with change in voltage of the alternating current source.

16. A system for transmitting power for variable amounts of time from an alternating current source to a load circuit and including means connecting the load circuit with a source of alternating current, means for supplying a peaking voltage wave to render said load connecting means conductive, phase shift means for adjusting the time in a cycle of alternating current at which said peaking voltage wave renders the gaseous discharge means conductive of current to said load circuit, said phase shift means including a manually adjustable means to change the timing of the gaseous discharge means to compensate for changes in the size of the load and also a source-voltage-responsive electronically variable impedance means for automatically rendering the gaseous discharge means conductive earlier in an alternating current cycle on reduction in source voltage and later in a cycle on increase in source voltage whereby said electronically variable impedance tends to uniformity in energy consumption of the load irrespective of source voltage changes.

17. A system for transmitting power for variable amounts of time from an alternating current source to a load circuit and including a gaseous discharge conducting means connecting the load circuit with a source of alternating current, means for supplying a peaking voltage wave to render said gaseous discharge means conductive, phase shift means for adjusting the time in a cycle of alternating current at which said peaking voltage wave renders the gaseous discharge means conductive of current to said load circuit, said phase shift means including a manually adjustable means to change the timing of the gaseous discharge means to compensate for changes in the size of the load and also a source-voltage-responsive electronically variable impedance means having substantially a resistance characteristic to retain an effective shape of the peaking voltage wave for automatically rendering the gaseous discharge means conductive earlier in an alternating current cycle on reduction in source voltage and later in a cycle on increase in source voltage whereby said electronically variable impedance tends to uniformity in energy consumption by the load irrespective of source voltage changes, said electronically variable impedance means comprising an electronic discharge tube having a grid biased by a unidirectional constant voltage means larger than a unidirectional variable voltage means which varies directly with the voltage of said source whereby said grid bias equals the difference between the constant and variable voltage means and said difference varies inversely with changes in said source voltage.

18. An electric transmission system for power for variable amounts of time including a gaseous discharge means for conducting and controlling current flow to a load circuit from an alternating current source, peaking voltage means for rendering the gaseous discharge means conductive, phase shift means for adjusting the time in a cycle of alternating current at which the peaking voltage occurs, said phase shift means including a manually adjustable resistance to adjust the timing of the peaking voltage supplied to the gaseous discharge means, a reactance in series with said resistance across said source of alternating current, an electronically variable resistance responsive to the voltage of said source, another resistance in series with said electroncally variable resistance also across said source of alternating current, said peaking voltage means including a peaking transformer connected between the junction of the reactance and manually adjustable resistance on the one hand and the junction of the electronically variable resistance and said other resistance on the other hand whereby a bridge is formed for controlling the timing of said gaseous discharge means both manually and automatically.

19. An electric transmission system for power for variable amounts of time including a gaseous discharge means for conducting and controlling current flow to a load circuit from an alternating current source, peaking voltage means for rendering the gaseous discharge means conductive, phase shift means for adjusting the time in a cycle of alternating current at which the peaking voltage occurs, said phase shift means including a manually adjustable resistance to adjust the timing of the peaking voltage supplied to the gaseous discharge means, a reactance in series with said resistance across said source of alternating current, an electronically variable resistance responsive to the voltage of said source, another resistance in series with said electroncally variable resistance also across said source of alternating current, said peaking voltage means including a peaking transformer connected between the junction of the reactance and manually adjustable resistance on the one hand and the junction of the electronically variable resistance and said other resistance on the other hand whereby a bridge is formed for controlling the timing of said gaseous discharge means both manually and automatically, said electroncally variable resistance being controlled by an electronic discharge tube having a grid biased by a unidirectional constant voltage means larger than a unidirectional variable voltage means which varies with the voltage of said source whereby said grid bias equals the difference between the constant and variable voltage means and said difference varies inversely with changes in said source voltage.

20. An apparatus for transferring power from an alternating current source to a load for variable periods of time comprising means for conducting current from said source to said load, means for rendering the first means conductive, phase shift means for controlling the timing of said conductive rendering means, said phase shift means including a manually adjustable resistance, a reactance in series with said resistance, the resistance and reactance being placed across the source of power, an electronically variable resistance, a second resistance, said electronically variable resistance and said second resistance being in series across said source of power, and a phase shift transformer connected across the junction of said manually adjustable resistance and said reactance and the junction of said electronically variable resistance and said second resistance.

21. A power transmission apparatus including means for transferring power from an alternating current source to a load circuit for variable periods of time, means for rendering the first means conductive, means for producing a peaking voltage wave, timing means for changing said peaking voltage wave to a value capable of actuating said first and second mentioned means, phase shift means for adjusting the timing of said peaking voltage wave and including a substantially instantaneously electronically adjustable impedance having a general resistance characteristic responsive to changes in the source voltage and controlled by an electron discharge tube having a grid biased by unidirectional voltage which varies inversely with changes in said source voltage whereby the peaking voltage wave is not operatively distorted, means for producing such grid biasing voltage including means for producing a substantially constant unidirectional potential, means for producing a smaller unidirectional potential which varies directly with changes in said source voltage whereby the difference in said constant and variable potentials constitutes said unidirectional voltage that varies inversely with changes in source voltage, and manually adjustable means for controlling the size of at least one of the unidirectional potentials effecting said difference in voltage.

22. In a system for transferring substantially constant amounts of alternating current energy from a power source to a load irrespective of source voltage changes, the combination of a normally non-conducting device interposed between source and load control means operated by current having a wave form similar to the voltage wave form of said source for making said device conductive within one-half of the line cycle, phase shift means connected with said source for energization of said control means at a given point in the source voltage half cycle, and means automatically responsive to source voltage changes for controlling the shift of said phase shift means to secure a normally constant energy output in the load circuit without substantial distortion of the cyclic current wave form operative on said control means, said automatically responsive means including an electronic discharge device having a unidirectional bias.

23. An apparatus including means for transferring power for variable periods of time from a source of alternating current to an electrical load circuit, a phase shift means for controlling the timing of said first-mentioned means, and means responsive to the voltage of said source of power for controlling said phase shift means to obtain nearly uniform energy consumption on the load irrespective of changes in the source voltage, said source-voltage-responsive means including an electronic discharge device having a unidirectional grid bias.

24. In an electric power transfer system, means for transferring power from an alternating current source to a load circuit, means for creating a peaking voltage wave for rendering the first means conductive at variable times in an alternating current cycle, phase shift means including an impedance for controlling said peaking voltage wave, and means responsive substantially instantaneously to source voltage change for changing the effective resistance of said impedance inversely as the source voltage whereby on decrease in source voltage the power transfer means is rendered conductive earlier and on increase in source voltage the power transfer means is rendered conductive later to make the energy consumption by said load circuit approximately uniform irrespective of voltage changes at said source.

25. An electric power system comprising in combination a load circuit, circuit means connecting the load circuit to a source of alternating current including an electronic discharge conducting means connected to control the flow of current in said load circuit, control means including a peaking transformer for rendering said electronic means conducting to permit the flow of load current, phase shift means connected to be energized from the source of alternating current for effecting the energization of said control means at a predetermined time in a cycle of the alternating current, said phase shift means comprising a bridge connected to the alternating current supply circuit having one branch including a manually adjustable impedance element and a second branch including an automatically controllable variable impedance element for controlling the phase of the voltage supplied to the peaking transformer in response to the voltage of the supply circuit, said peaking transformer being connected across points of the branches intermediate the terminals wherein the arrangement of the branches is such that each branch may exert its phase shifting operation substantially independently of the other.

26. An electric power system comprising in combination a load circuit, circuit means connecting the load circuit to a source of alternating current including an electronic discharge conducting means connected to control the flow of current in said load circuit, control means for rendering said electronic means conducting to permit the flow of load current, phase shift means connected to be energized from the source of alternating current for effecting the energization of said control means at a predetermined time in a cycle with the alternating current, said phase shift means comprising a phase shifting means of the bridge type including a branch having a manually adjustable impedance element for determining the range of the phase shift of voltage applied to said control means, and including another branch comprising a transformer, means connected to the transformer comprising a pair of electric discharge devices, each having a grid and together serving with said transformer as a substantially pure resistance element of the phase shifting means, voltage dividers connected to said current supply circuit and means connected between the grids of the discharge devices and said voltage dividers for adjusting the phase shifting means and for providing different amounts of compensatory action for different adjustments of the manually adjustable impedance element.

27. An electric power system comprising in combination a load circuit, circuit means connecting the load circuit to a source of alternating current including an electronic discharge conducting means connected to control the flow of current in said load circuit, control means for rendering said electronic means to permit the flow of load current phase shift means connected to be energized from the source of alternating current or effecting the energization of said control means at a predetermined time in a cycle with the alternating current, said phase shift means comprising a phase shifting means of the bridge type including a branch having a manually adjustable impedance element for determining the range of the phase shift of voltage of said control means and including another branch comprising a transformer, means connected to the transformer comprising a pair of electric discharge devices, each having a grid and together serving with said transformer as a substantially pure resistance element of the phase shifting means, a rectifier responsive to the voltage of the alternating current supply circuit, a voltage divider connected across the output circuit of said rectifier, means for producing a unidirectional reference voltage comprising a second voltage divider, and means connected between the grids of the devices, and said voltage dividers for adjusting the second voltage divider to adjust the phase shifting means and for providing different amounts of compensatory action for different adjustments of the manually adjustable impedance element.

ROBERT S. PHAIR.